(12) United States Patent
Lu et al.

(10) Patent No.: US 8,143,743 B2
(45) Date of Patent: Mar. 27, 2012

(54) UNINTERRUPTIBLE POWER SUPPLY APPARATUS

(75) Inventors: Yan-Song Lu, Shanghai (CN); Jing-Tao Tan, Shanghai (CN); Jian-Ping Yang, Shanghai (CN); Jian-Ping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 12/846,332

(22) Filed: Jul. 29, 2010

(65) Prior Publication Data

US 2010/0308658 A1 Dec. 9, 2010

Related U.S. Application Data

(63) Continuation of application No. 11/774,277, filed on Jul. 6, 2007, now abandoned.

(30) Foreign Application Priority Data

Jul. 12, 2006 (TW) ............................... 95125557 A

(51) Int. Cl.
*H02J 9/00* (2006.01)

(52) U.S. Cl. ............... 307/64; 363/34; 363/36; 363/37; 363/101; 323/259; 323/271; 323/344

(58) Field of Classification Search ................ 307/64; 363/34, 36, 37, 101; 323/259, 344

See application file for complete search history.

(56) References Cited

U.S. PATENT DOCUMENTS

| | | | |
|---|---|---|---|
| 3,769,571 A | 10/1973 | Wilkinson | |
| 5,734,258 A * | 3/1998 | Esser | 323/224 |
| 6,184,593 B1 | 2/2001 | Jungreis | |
| 6,343,021 B1 * | 1/2002 | Williamson | 363/8 |
| 7,508,094 B2 | 3/2009 | Johnson, Jr. et al. | |
| 7,557,464 B2 * | 7/2009 | Wang et al. | 307/65 |
| 7,852,060 B2 * | 12/2010 | Omet et al. | 323/285 |
| 2001/0001535 A1 | 5/2001 | Johnson, Jr. et al. | |
| 2001/0015904 A1 | 8/2001 | Kimura et al. | |
| 2004/0027101 A1 * | 2/2004 | Vinciarelli | 323/259 |
| 2005/0093373 A1 | 5/2005 | Chapman et al. | |
| 2005/0201123 A1 | 9/2005 | Usui et al. | |

* cited by examiner

*Primary Examiner* — Jared Fureman
*Assistant Examiner* — Justen Fauth
(74) *Attorney, Agent, or Firm* — Volpe and Koenig, P.C.

(57) ABSTRACT

A method of controlling an uninterruptible power supply apparatus (UPS) is provided. The UPS apparatus includes at least an AC input voltage, a DC input voltage and a single-phase AC/AC converter. The single-phase AC/AC converter includes an AC inductor, a bus capacitor, a boost arm, a common arm and a buck arm. The method includes steps of: controlling the bus voltage to have a DC component and full-wave rectifying component, and setting a bus voltage parameter K so that the bus voltage approaches to a full-wave rectifying voltage when K approaches to 1, wherein $0 \leq K \leq 1$.

12 Claims, 6 Drawing Sheets

| selecting switch | Sw1 | Sw2 | Sw3 |
|---|---|---|---|
| AC mode | On | Off | Off |
| DC mode | Off | On | Off |
| bypass mode | Off | Off | on |

Fig. 3(b)

UNINTERRUPTIBLE POWER SUPPLY APPARATUS

CROSS REFERENCE TO RELATED APPLICATION

This application is a continuation of U.S. patent application Ser. No. 11/774,277, filed Jul. 6, 2007, which is incorporated by reference as if fully set forth.

FIELD OF THE INVENTION

The present invention relates to a method of controlling an uninterruptible power supply apparatus, particularly to an uninterruptible power supply of a simple-phase AC/AC converter having three arms.

BACKGROUND OF THE INVENTION

Please refer to FIG. 1 which is a circuit diagram of a conventional line-interactive uninterruptible power supply. In FIG. 1, the conventional line-interactive uninterruptible power supply contains an AC input voltage AC, a switch containing two diodes D1 and D2, a single-phase AC/AC converter 11, an AC filter 12 containing a filter inductor Lo and a filter capacitor Co, and a load R.

The single-phase AC/AC converter 11 contains an AC inductor Li, a bus capacitor Cs and three arms. The three arms are respectively a boost arm comprising a switch 51 and a switch S2, a common arm comprising a switch S3 and a switch S4 and a buck arm comprising a switch S5 and S6.

An AC input voltage AC directly provides energy to the load R by the line-interactive uninterruptible power supply 1 of FIG. 1 when the AC input voltage AC (mains electricity) is operated normally. The boost arm and the common arm execute a rectifying function. When the AC input voltage functions abnormally, a storing battery (not shown) provides energy to the load R. At this time, the common arm and the buck arm execute an inverting function.

In fact, two switches S3 and S4 of the common arm are controlled by network frequency. The switching frequency is low-frequency switching. Therefore, the boost arm is used as a rectifying device and the buck arm is used as an inverting device.

In the prior arts, in order to implement regulation of the AC input voltage, several controlling methods could be used. The difference between the controlling methods was to generate bus voltages having different waveforms. The following explanations show two kinds of common methods of controlling the bus voltages having different waveforms.

Please refer to FIGS. 2(a) and 2(b) which were waveform diagrams of bus voltages of an uninterruptible power supply of FIG. 1 for different controlling methods. The FIGS. 2(a) and 2(b) showed respectively waveforms of different bus voltages. The bus voltage of FIG. 2(a) had a DC voltage waveform while the bus voltage of FIG. 2(b) had a full-wave rectifying voltage waveform. Certainly, the different bus voltages generated under different controlling methods had advantages and drawbacks.

In order to obtain the DC bus voltage shown in FIG. 2(a), the buck arm and the boost arm must be operated under a high frequency pulse-width-modulation mode and the common arm must be operated at low frequency switch state. When the AC input voltage AC was a positive half-wave, the switch S4 turned off. When the AC input voltage AC was a negative half-wave, the switch S3 turned off. An unit input power factor was obtained by using a method of calculating an input current and an input voltage so as to obtain a duty cycle of the buck arm of a single-phase AC/AC converter 11. Therefore, a DC voltage was controlled by controlling an increasing amount of an input reference current.

A main advantage of this controlling method was that the input current could be controlled to be a sine-wave so as to obtain an unit input power factor. An output voltage could be accurately regulated. A no-load current would decrease. On the contrary, a main drawback was that a switch loss was large and a an efficiency was poor (especially under full-load).

In order to obtain a full-wave bus voltage shown in FIG. 2(b), when the AC input voltage AC was abnormal, a converter 11 was operated at a boost state, the switches S1 and S2 of the boost arm were operated under high frequency pulse-width-modulation mode. When the converter 11 was operated at a buck state, only the switches S5 and S6 of the buck arm were operated high frequency pulse-width-modulation mode. Besides, a capacitance of a bus capacitor Cs was small, then a bus voltage having full-wave rectifying voltage waveform shown in FIG. 2(b) was obtained.

A main advantage of this controlling method was that the volume could be decreased, reliability of the circuit was enhanced and usage life of the circuit was lengthened by using a high frequency film capacitor as the bus capacitor Cs. Besides, a loss of the switches was small when a design of the controlling unit was simplified.

A main drawback of this controlling method was a poor dynamic performance, a large reactive current of input, and a large ripple current of the bus capacitor Cs. Because a current flowing through the load R during light-load and no-load periods was small, in order to maintain the full-wave rectifying voltage waveform of the bus capacitor Cs, an inefficient charging and discharging on the bus capacitor Cs was carried out. But, a large loss of the converter 11 was generated during light-load or no-load period.

SUMMARY OF THE INVENTION

It is an object of the present invention to provide a method of controlling an uninterruptible power supply apparatus for use in a single-phase AC/AC converter of the uninterruptible power supply apparatus having three arms. In prior arts, there were mentioned two kinds of conventional controlling modes, the first was (1) a DC voltage controlling mode for a voltage waveform on a bus line 13, and the second was (2) a full-wave rectifying waveform controlling mode for a voltage waveform on the bus line 13. The controlling method of the present invention tries to sustain the advantages of the two conventional controlling modes and to overcome the drawbacks of them in order to obtain better effects.

According to a main aspect of the present invention, there is provided a method of controlling an uninterruptible power supply apparatus for use in the single-phase AC/AC converter of the uninterruptible power supply apparatus having three arms. According to an analysis of an operation of the AC/AC converter, waveforms on a bus capacitor are controlled by segment division in order to decrease a reactive current generated by the bus capacitor and to decrease a high frequency ripple current through the bus capacitor and, at the same time, to obtain high efficiency under all-input range no matter when the system (the uninterruptible power supply apparatus) is operated in light-load or heavy-load state, when the system can maintain operation under high efficiency.

According to one aspect of the present invention, there is provided a method of controlling an uninterruptible power supply apparatus having a bus voltage, an AC input voltage, a DC input voltage and a single-phase AC/AC converter including an AC inductor, a bus capacitor, a boost arm, a common arm and a buck arm, the method comprising steps of:

(a) controlling the bus voltage to have a DC voltage and a full-wave rectifying voltage; and (b) setting a bus voltage parameter K where $0 \leq K \leq 1$, so that the bus voltage approaches to the DC voltage when K approaches to 0 and the bus voltage approaches to the full-wave rectifying voltage when K approaches to 1;

wherein when the AC input voltage is normal, the bus voltage is rectified via the single-phase AC/AC converter to output, and when the AC input voltage is abnormal, the DC input voltage is inverted via the single-phase AC/AC converter to output.

Preferably, the uninterruptible power supply apparatus includes a switch set, an AC filter and a load.

Preferably, in step (b) when the load is light-load, the bus voltage parameter K is increased to approach to 1, and when the load is heavy-load, the bus voltage parameter K is decreased to approach to 0.

In accordance with the present invention, the method further comprises a step of (c) setting a duty cycle d3 of the buck arm, a duty cycle d1 of the boost arm and a voltage gain M of the single-phase AC/AC converter to meet an equation of $d3=M(1-d1)$.

In accordance with the present invention, the method further comprises a step of (d) defining a wave function F of the bus voltage to meet the following condition: when $|\sin(wt)|>K$, $F=|\sin(wt)|$; and when $|\sin(wt)| \leq K$, $F=K$, wherein w is an angular velocity, and t is a passing time.

In accordance with the present invention, the duty cycle d1 of the boost arm, the voltage gain M of the single-phase AC/AC converter, the bus voltage parameter K and the wave function of the bus voltage F meet an equation $d1=(2-M)KF$.

In accordance with the present invention, the method further comprises a step of (d) controlling one of boost arm and the buck arm to operate under a pulse-width-modulation mode when $\sin(wt)>1/K$, and controlling both of the boost arm and the buck arm to operate under pulse-width-modulation mode when $\sin(wt)<1/K$.

According to another aspect of the present invention, there is provided a method of controlling an uninterruptible power supply apparatus having a bus voltage, an AC input voltage, a DC input voltage and a single-phase AC/AC converter comprising an AC inductor, a bus capacitor, a boost arm, a common arm and a buck arm, the method comprising steps of: (a) controlling the bus voltage and making the bus voltage have a waveform including a low slope segment and a full-wave rectifying segment; (b) setting a bus voltage parameter K representing an amount of an output power, wherein $0 \leq K \leq 1$; and (c) regulating a proportion of the low slope segment and the full-wave rectifying segment within a full cycle based on a variation of the bus voltage parameter K, the waveform of the bus voltage during the low slope segment having a slope lower than a further slope of the waveform of the bus voltage during the full-wave rectifying segment; wherein, when the AC input voltage is normal, the bus voltage is rectified via the single-phase AC/AC converter to output, and when the AC input voltage is abnormal, the DC input voltage is inverted via the single-phase AC/AC converter to output.

Preferably, an average voltage value during the full-wave rectifying segment is larger than that during the low slope segment.

In accordance with the present invention, the method further comprises a step of (d) increasing a duration of the low slope segment and decreasing a duration of the full-wave rectifying segment when the output power decreases.

In accordance with the present invention, the waveform of the bus voltage is obtained by regulating duty cycles of the boost arm and the buck arm.

According to another aspect of the present invention, there is provided a method of controlling an uninterruptible power supply apparatus having a bus voltage, an AC input voltage, a DC voltage and an AC/AC converter, comprising steps of: (a) controlling the bus voltage to provide one of a DC voltage and a full-wave rectifying voltage; and (b) setting a bus voltage parameter K, where $0 \leq K \leq 1$, so that the bus voltage approaches to the DC voltage when K approaches to 1 and the bus voltage approaches to the full-wave rectifying voltage when K approaches to 0.

The foregoing and other features and advantages of the present invention will be more clearly understood through the following descriptions with reference to the drawings, wherein:

BRIEF DESCRIPTION OF THE DRAWINGS

FIG. 3(b) is a switch status table showing each main switch is operated under different operational modes in FIG. 3(a) according to the present invention;

DETAILED DESCRIPTION OF THE PREFERRED EMBODIMENT

Figure 1:
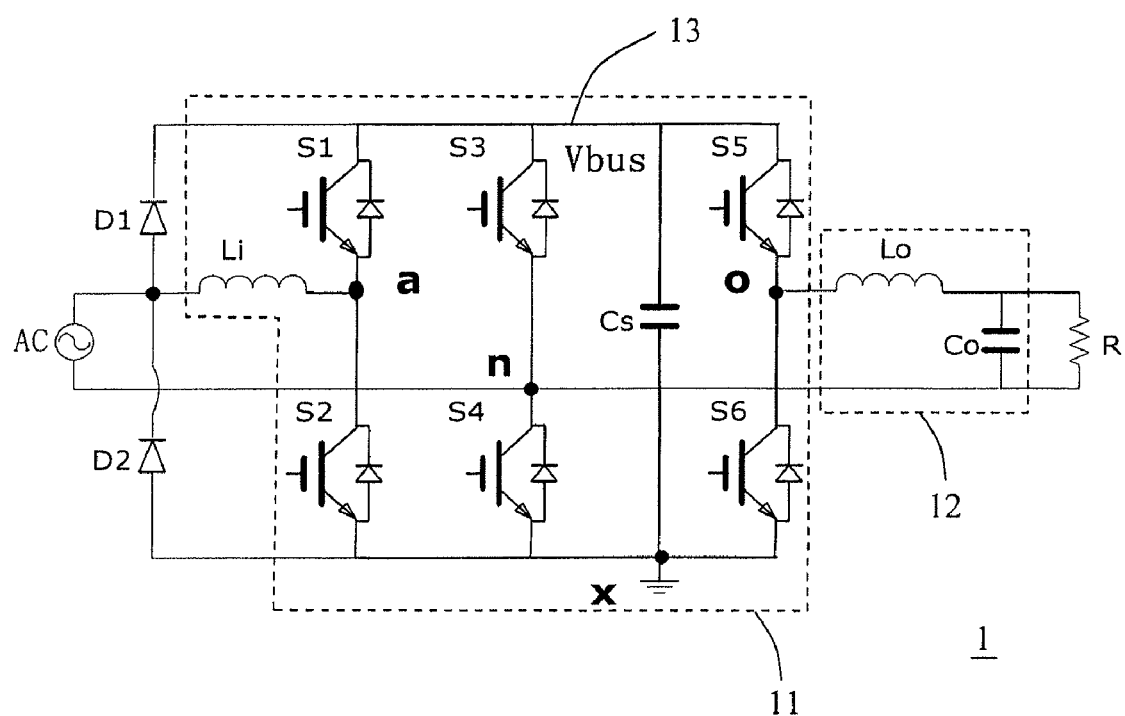
FIG. 1 is a circuit diagram of a conventional line-interactive uninterruptible power supply.
Figure 3A:
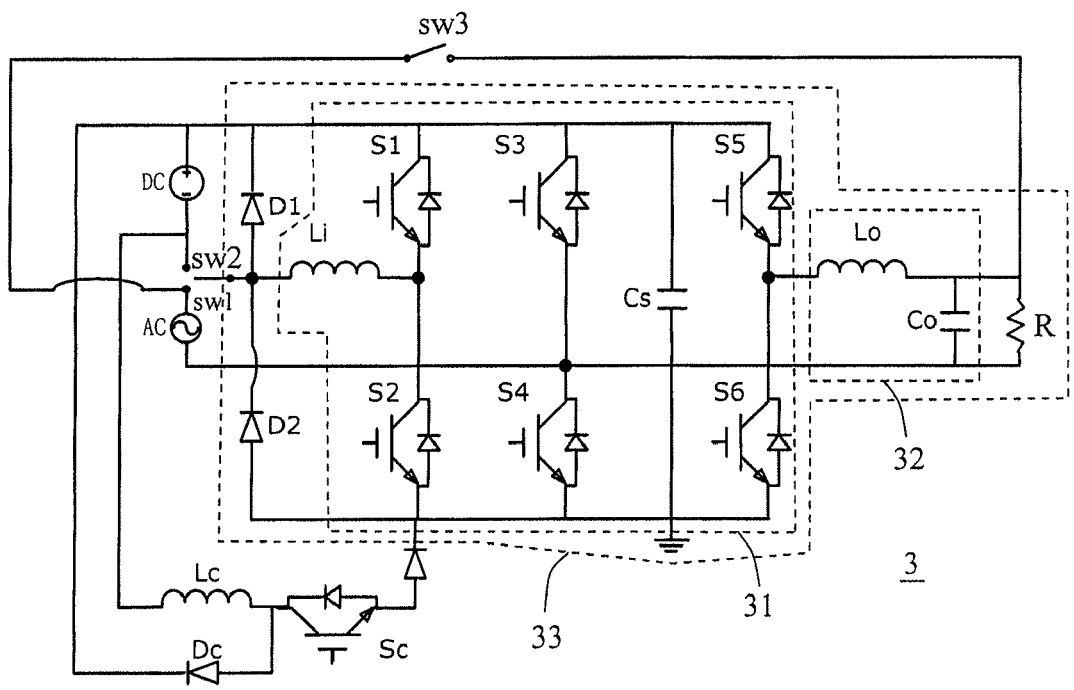
FIG. 3(a) is a circuit diagram showing an line-interactive uninterruptible power supply of the present invention.

The present invention will now described more specifically with reference to the following embodiments. Please refer to FIG. 3(a) which is a circuit diagram of a line-interactive uninterruptible power supply apparatus on which the controlling method of the present invention is applied. The numerals of FIG. 3(a) are similar to those of FIG. 1 for the same components. The line-interactive uninterruptible power supply apparatus 3 contains a DC input voltage DC, an AC input voltage AC, a switch set 33 containing diodes D1 and D2, a single-phase AC/AC converter 31, an AC filter 32 containing a filter inductor Lo and a filter capacitor Co, and a load R.

The single-phase AC/AC converter 31 contains an AC inductor Li, a bus capacitor Cs and three arms. A arm containing switches S1 and S2 is called as a boost arm. A arm containing switches S3 and S4 is called as a common arm. A arm containing switches S5 and S6 is called as a buck arm. Switches SW1, SW2 and SW3 are respectively used to control three operations of the AC input voltage AC, the DC input voltage DC and a bypass mode.

Please refer to FIG. 3(b) which is a switch status table of different operation modes by the main switches in FIG. 3(a). According to FIG. 3(b), it is known that for the line-interactive uninterruptible power supply apparatus 3 under operation of the AC input voltage AC (mains electricity), the switch SW1 is turned on and the switches SW2 and SW3 are switched to be turned off so that the bus voltage is rectified by the simple-phase AC/AC converter 31 and output to the load R. When the performance of the AC input voltage AC is abnormal, the switch SW2 is turned on and the switches SW1 and SW3 are switched to be turned off, and the DC input voltage is inverted through the single-phase AC/AC converter to output. When the line-interactive uninterruptible power supply apparatus 3 does not function, the switch SW3 is turned on and the switches SW1 and SW2 are switched to be turned off to let technicians maintain the device.

Figure 2A:
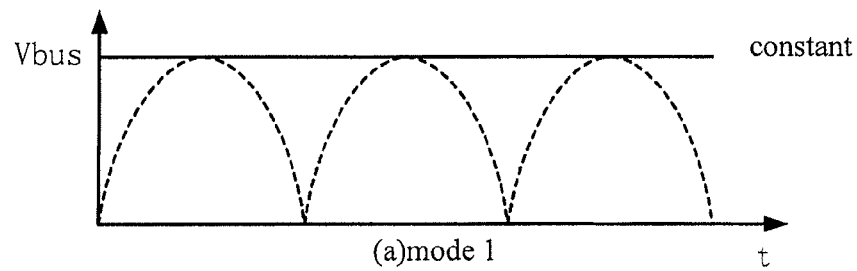
FIGS. 2(a) and 2(b) are diagrams showing waveforms of the bus voltage under different controlling methods for the conventional line-interactive uninterruptible power supply shown in FIG. 1.
Figure 2B:
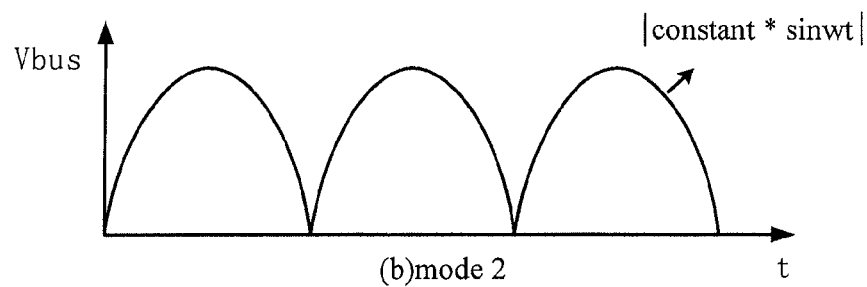
Figure 2C:
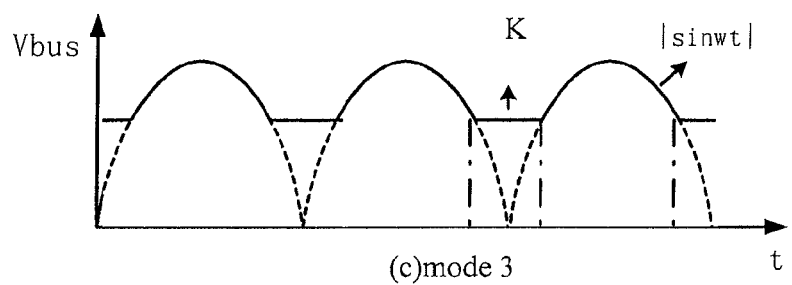
FIG. 2(c) is a diagram showing a waveform of the bus voltage applied by using the controlling method for an uninterruptible power supply of the present invention.

A main object of the controlling method of the present invention is to obtain the bus voltage shown in FIG. 2(c). Similar to the conventional techniques, the bus capacitor Cs has such a small capacitance that a voltage having a full-wave rectifying voltage waveform is obtained. The method of controlling the bus voltage of the present invention which has a DC voltage and a full-wave rectifying voltage is explained as follows.

As shown in FIG. 2(c), firstly, a bus voltage parameter K is set between 0 and 1. When the K value approaches to 0, the full-wave rectifying voltage of the bus voltage becomes larger and the waveform of the bus voltage approaches to a waveform of full-wave rectifying voltage. When the K value approaches to 1, the DC voltage of the bus voltage becomes larger and the waveform of the bus voltage approaches to a waveform of a DC voltage. The low slope segment is defined as the segment of the waveform when DC voltage is conductive according to FIG. 2(c).

When the line-interactive uninterruptible power supply apparatus 3 is running and the load R is a light-load, the reactive current of the converter 31 occupies a large proportion of the current. The light load here is defined as a small resistance of the load R, and the heavy load is defined as a large resistance of the load R. Then, the K value is correspondently increased to decrease the reactive current. On the other hand, when the load R becomes larger, the main concern is the efficiency of the converter 31. Then, the K value is correspondently decreased to decrease the loss of each switch and to increase the whole efficiency of the converter 31.

In the above controlling method, the mode of the variation of the K value is irrelevant to a load current. A voltage gain determines a duty cycle d3 of each switch of the buck arm and a duty cycle d1 of each switch of the boost arm. Furthermore, the switches S3 and S4 of the common arm are relevant to a polarity of the AC input voltage AC. When the voltage gain M is smaller than 1, the converter 31 is operated under a buck mode. When the voltage gain M is larger than 1, the converter 31 is operated under a boost mode.

A wave function F of the bus voltage for the controlling method of the present invention is defined to meet the following condition:

when $|\sin(wt)| > K$, $F = |\sin(wt)|$; and when $|\sin(wt)| \leq K$, $F = K;$ (1)

wherein w is an angular velocity, and t is a passing time.

The duty cycle d3 of the buck arm, the duty cycle d1 of the boost arm, the voltage gain M of the simple-phase AC/AC converter, the bus voltage parameter K and the wave function of the bus voltage F meet equations:

$$d3 = M(1-d1);$$ (2)

$$d1 = (2-M)KF$$ (3)

Figure 4A:
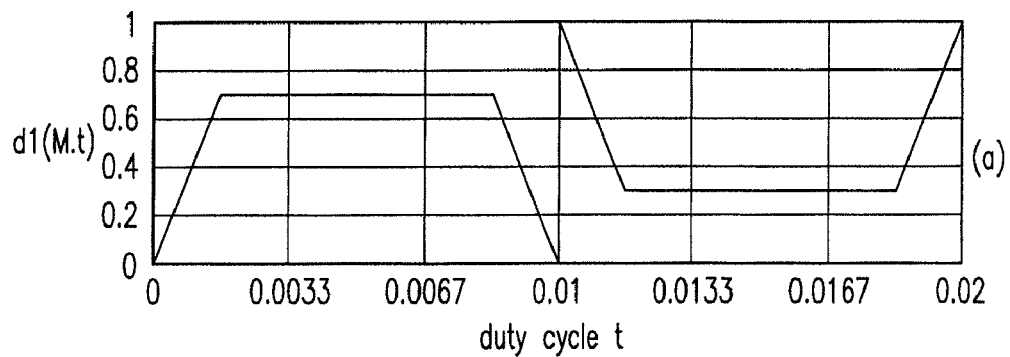
FIG. 4(a) is a timing diagram showing a duty cycle of a boost arm under a boost mode according to the controlling method of the present invention.
Figure 4B:
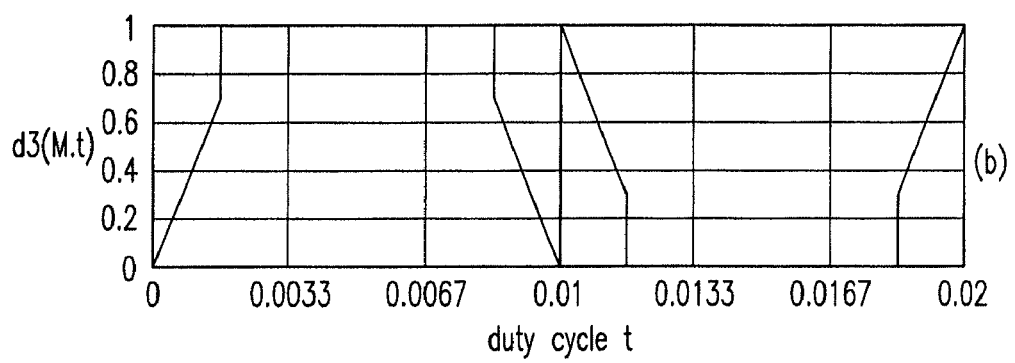
FIG. 4(b) is a timing diagram showing a duty cycle of a buck arm under a boost mode according to the controlling method of the present invention.

When the voltage input from mains electricity (the AC input voltage AC) is lower than the required value, it is necessary to increase the input voltage and the system is under boost mode and the voltage gain M is between 1 to 1.3. It can be known from equations (2)-(3) that it is necessary to control the duty cycle of the switches of the buck arm as shown in FIG. 4(b) while a duty cycle of the switches of the boost arm at the same time is shown in FIG. 4(a).

Figure 5A:
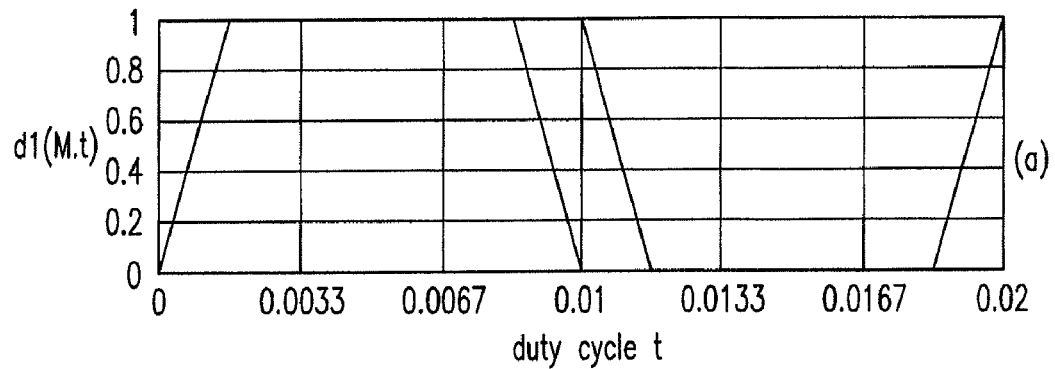
FIG. 5(a) is a timing diagram showing a duty cycle of a boost arm under a buck mode according to the controlling method of the present invention.
Figure 5B:
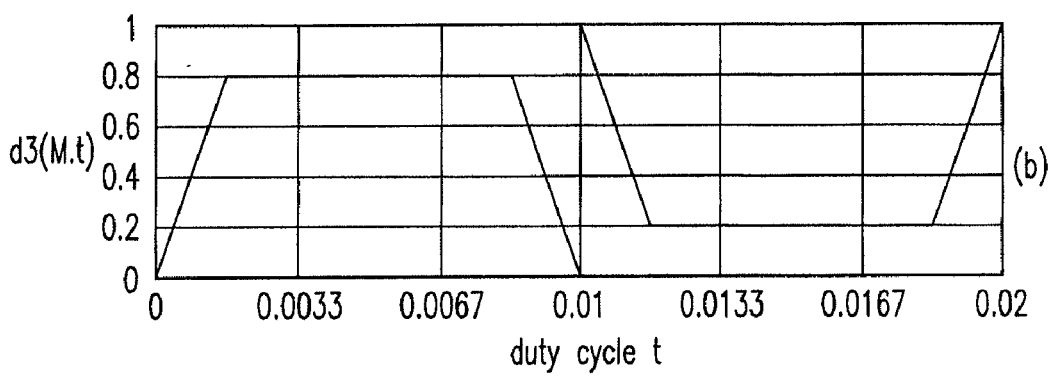
FIG. 5(b) is a timing diagram showing a duty cycle of a buck arm under a buck mode according to the controlling method of the present invention.

When the voltage input from mains electricity is higher than the required value, it is necessary to decrease the input voltage and the system is under the buck mode and the voltage gain M is between 0.7 to 1. It can be known from equations (2)-(3) that it is necessary to control the duty cycle of the switches of the boost arm as shown in FIG. 5(a) while a duty cycle of the switches of the buck arm at the same time is shown in FIG. 5(b).

It shall be noted that in view of timing, during a same cycle when $\sin(wt) > 1/k$, one of the boost arm and the buck arm is operated under the pulse-width-modulation mode. When $\sin(wt) < 1/k$, both of the boost arm and the buck arm are operated under the pulse-width-modulation mode.

It shall be noted that the examples shown above in the present invention are relevant to a combination of a DC waveform and a full-wave rectifying waveform. But, as to the object of the present invention, a decrease in the slope of the voltage waveform variation during a light-load period can increase the efficiency compared to the original full-wave rectifying waveform.

Accordingly, the present invention provides a method of controlling an uninterruptible power supply apparatus having three arms for use in the single-phase AC/AC converter. By controlling the voltage waveform on the bus capacitor by segment method, waveforms on a bus capacitor are controlled by segment division in order to decrease a reactive current generated by the bus capacitor and to decrease a high frequency ripple current through the bus capacitor and, at the same time, to obtain high efficiency under all-input voltage range no matter when the system (the uninterruptible power supply apparatus) is operated in light-load or heavy-load state, the system can maintain operation under high efficiency.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An uninterruptible power supply apparatus, comprising:
   a load;
   an AC input receiving an AC input voltage; and
   a single-phase AC/AC converter connected to the AC input and including an AC inductor, a bus capacitor having a bus voltage, a boost arm having a first switch and a second switch, a common arm having a third switch and a fourth switch and a buck arm having a fifth switch and a sixth switch, wherein the buck arm is connected to the bus capacitor, the boost arm and the common arm in parallel, wherein a bus voltage parameter K is set in a range of $0 \leq K \leq 1$, so that the bus voltage approaches to a DC voltage when K approaches to 1 while the load is light-load, the bus voltage approaches to a full-wave rectifying voltage when K approaches to 0 while the load is heavy-load, the first switch and the second switch of the boost arm, the third switch and the fourth switch of the common arm and the fifth switch and the sixth switch of the buck arm are controlled so that the bus voltage has a waveform including a DC segment when $|\sin(wt)| \leq K$ and a full-wave rectifying segment when $|\sin(wt)| > K$, where w is an angular velocity and t is a passing time, to implement a regulation of the AC input voltage, and an average voltage value of the bus during the full-wave rectifying segment is larger than that during the DC segment.

2. The uninterruptible power supply apparatus according to claim 1, wherein the uninterruptible power supply apparatus further comprises a switch set, an AC filter and a load.

3. The uninterruptible power supply apparatus according to claim 2, wherein when the load is light-load, the bus voltage parameter K is increased to approach to 1, and when the load is heavy-load, the bus voltage parameter K is decreased to approach to 0.

4. The uninterruptible power supply apparatus according to claim 1, wherein a duty cycle d3 of the buck arm, a duty cycle d1 of the boost arm and a voltage gain M of the single-phase AC/AC converter are set to meet an equation of $d3=M(1-d1)$.

5. The uninterruptible power supply apparatus according to claim 4, wherein a wave function F of the bus voltage is defined to meet the following conditions;

when $|\sin(wt)| > K$, $F=|\sin(wt)|$; and when $|\sin(wt)| \leq K$, $F=K$.

6. The uninterruptible power supply apparatus according to claim 5, wherein the duty cycle d1 of the boost arm, the voltage gain M of the single-phase AC/AC converter, the bus voltage parameter K and the wave function of the bus voltage F meet an equation $d1=(2-M)KF$.

7. The uninterruptible power supply apparatus according to claim 6, wherein one of the boost arm and the buck arm is controlled to operate under a pulse-width-modulation mode when $\sin(wt) > 1/K$, and both of the boost arm and the buck arm are controlled to operate under a pulse-width-modulation mode when $\sin(wt) < 1/K$.

8. An uninterruptible power supply apparatus, comprising:
a load:
an AC input receiving an AC voltage; and
a single-phase AC/AC converter connected to the AC input and including an AC inductor, a bus capacitor having a bus voltage, a boost arm having a first switch and a second switch, a common arm having a third switch and a fourth switch and a buck arm having a fifth switch and a sixth switch and connected to the bus capacitor, the boost arm and the common arm in parallel, wherein the bus voltage is controlled to have a waveform including a low slope segment when $|\sin(wt)| \leq K$ and a full-wave rectifying segment when $|\sin(wt)| > K$, where K is a bus voltage parameter K representing an amount of an output power, is set in a range of $0 \leq K \leq 1$, is increased to approach 1 when the load is light-load and is decreased to approach 0 when the load is heavy-load, w is an angular velocity and t is a passing time, the first switch and the second switch of the boost arm, the third switch and the fourth switch of the common arm and the fifth switch and the sixth switch of the buck arm are controlled to regulate a proportion of the low slope segment and the full-wave rectifying segment within a full cycle to implement a regulation of the AC input voltage, an average voltage value of the bus during the full-wave rectifying segment is larger than that during the low slope segment and the waveform of the bus voltage during the low slope segment has a slope lower than that of the waveform of the bus voltage during the full-wave rectifying segment.

9. The uninterruptible power supply apparatus according to claim 8 further comprising an AC filter connected to the single-phase AC/AC converter and the load and providing the output power, wherein a duration of the low slope segment is increased and a duration of the full-wave rectifying segment is decreased when the output power decreases.

10. The uninterruptible power supply apparatus according to claim 8, wherein the waveform of the bus voltage is obtained by regulating duty cycles of the boost arm and the buck arm.

11. An uninterruptible power supply apparatus according to claim 8, further comprising a DC input receiving a DC input voltage, and a seventh switch, wherein when the AC input voltage is normal, the seventh switch is switched to the AC input and the AC input voltage is rectified via the single-phase AC/AC converter and is outputted, and when the AC input voltage is abnormal, the seventh switch is switched to the DC input and the DC input voltage is inverted via the single phase AC/AC converter and is outputted.

12. An uninterruptible power supply apparatus according to claim 11, further comprising a DC input receiving a DC input voltage, and a seventh switch, wherein when the AC input voltage is normal, the seventh switch is switched to the AC input and the AC input voltage is rectified via the single phase AC/AC converter and is outputted, and when the AC input voltage is abnormal, the seventh switch is switched to the DC input and the DC input voltage is inverted via the single phase AC/AC converter and is outputted.

* * * * *